United States Patent [19]

Bonde

[11] Patent Number: 5,051,045
[45] Date of Patent: Sep. 24, 1991

[54] AIRCRAFT REWORK DRILL BAR

[76] Inventor: Michael E. Bonde, Apt. 14, 9826 Cedar St., Bellflower, Calif. 90706

[21] Appl. No.: 653,504

[22] Filed: Feb. 11, 1991

[51] Int. Cl.$^5$ ............................................. B23B 47/28
[52] U.S. Cl. ............................... 408/115 R; 408/72 B
[58] Field of Search ..................... 408/72 R, 72 B, 97, 408/115 R, 115 B

[56] References Cited

U.S. PATENT DOCUMENTS

| | | | |
|---|---|---|---|
| 2,608,113 | 8/1952 | Stainton | 408/115 R |
| 3,148,562 | 9/1964 | Moss | 408/115 R |
| 3,176,548 | 4/1965 | Leerkamp | 408/115 R |
| 4,669,926 | 6/1987 | Wilcox, Jr. | 408/72 B |
| 4,880,339 | 11/1989 | Döge | 408/161 |

FOREIGN PATENT DOCUMENTS

| | | | |
|---|---|---|---|
| 1168349 | 7/1985 | U.S.S.R. | 408/115 B |
| 1537405 | 1/1990 | U.S.S.R. | 408/115 B |
| 792427 | 3/1958 | United Kingdom | 408/115 R |
| 882233 | 11/1961 | United Kingdom | 408/115 R |

*Primary Examiner*—Daniel W. Howell
*Attorney, Agent, or Firm*—James D. Thackrey

[57] ABSTRACT

A device for use in removal/replacement of single rivets or other fasteners in lines of same, by holding a drill bushing holder rigidly above the defective fastener. The unique features are a tongue and groove joint midway along the device, which can then be locked at any angle, and multiple narrow holddown slots which slide on the anchoring bolts in one direction only, expediting position adjustment.

2 Claims, 1 Drawing Sheet

AIRCRAFT REWORK DRILL BAR

BACKGROUND OF THE INVENTION

1. Field of the Invention

During aircraft manufacture very large numbers of rivets are installed, precisely spaced in rows. Upon inspection of the work, it is frequently found that one rivet in the row is not headed properly, installed crookedly, or has another defect requiring its removal and replacement. This invention is part of a guide for the drill which cuts away the defective rivet or other fastener and later prepares the hole for acceptance of a replacement fastener, usually an oversize one specially made to retain all the fit and strength properties designed into the original fastener and joint The invention receives the desired size drill bushing, permits it to be located exactly, and permits of clamping to existing structure so the new rivet hole will be "perfect" and not require another rework cycle. The name industry uses for the part which holds the drill bushing in position is "drill bar".

2. Description of Prior Art

Depending on the location and surroundings of the defective fastener to be replaced, a variety of approaches is called for. Typically existing drill bars are held in place from one side only, the bushing holder being on one end of the bar. Sometimes the bar is held down by removing nearby rivets, the holes of which may then be used for clamping bolts. Existing drill bars usually have a wide (say ⅜ inch) slot through which a ¼ inch diameter holddown bolt passes. There is obviously no possibility of drilling the frame or panel to create a mounting hole for the repair tool, but C clamps are also often usable to avoid removing sound rivets, and the risk associated with doing that. It should also be mentioned that, since each rework is unique, grinding away part of existing drill bars to fit the circumstances is very common.

My invention basically provides an adjustable-angle dogleg in the length of the drill bar, resulting in two embodiments, permitting either two-sided holddown of the bar or allowing holddown to occur outside the line of fasteners and avoiding removal of good fasteners solely to anchor the drill bar. Both embodiments allow easier clamping to the various contours likely to be present in fastener-lines in aircraft. Also using narrow slots as holddown means restricts sliding under the anchor bolts to one direction which expedites installation.

SUMMARY OF THE INVENTION

The invention consists of a metal bar of rectangular cross section with a tongue and groove joint along its length to permit angular motion between the ends (a dogleg). It also has through-slots, several running lengthwise, narrow enough to receive anchor bolts or proprietary fasteners with little sideways motion or slop, a feature which expedites clamping of the drill bar in position on the structure to be reworked. On one embodiment the tongue and groove joint is through-penetrated by a pin consisting of a drill bushing holder perpendicular to the tongue, permitting adjustment (pivoting) of the dogleg angle. Adjacent the drill bushing holder is an angle-locking screw, passing first through a clearance hole in one flange of the groove, then through an arcuate slot in the tongue, and finally into a threaded hole in the other flange of the groove. The screw, upon tightening, locks in the dogleg angle by squeezing the flanges of the groove against the tongue.

In another embodiment the drill bushing holder is located on one end of the drill bar, and a solid pin and locking screw are used at the dogleg joint. In this embodiment the through-slots for mounting are only provided in the section of the bar which does not carry the drill bushing holder.

The invention thus provides more flexibility to the rework operation in that, though it permits use in the same manner as existing drill bars by disassembling the tongue and groove joint, it also allows the use of anchor bolts on both sides of the defective rivet, as well as allowing the drill bar mounting location to be offset from the line of rivets requiring rework, and easier access to concave curved areas on aircraft by reason of the adjustable dogleg angle, though it may also be used for any precise hole location which is to be accomplished with handheld cutting tools.

DETAILED DESCRIPTION

Figure 1:
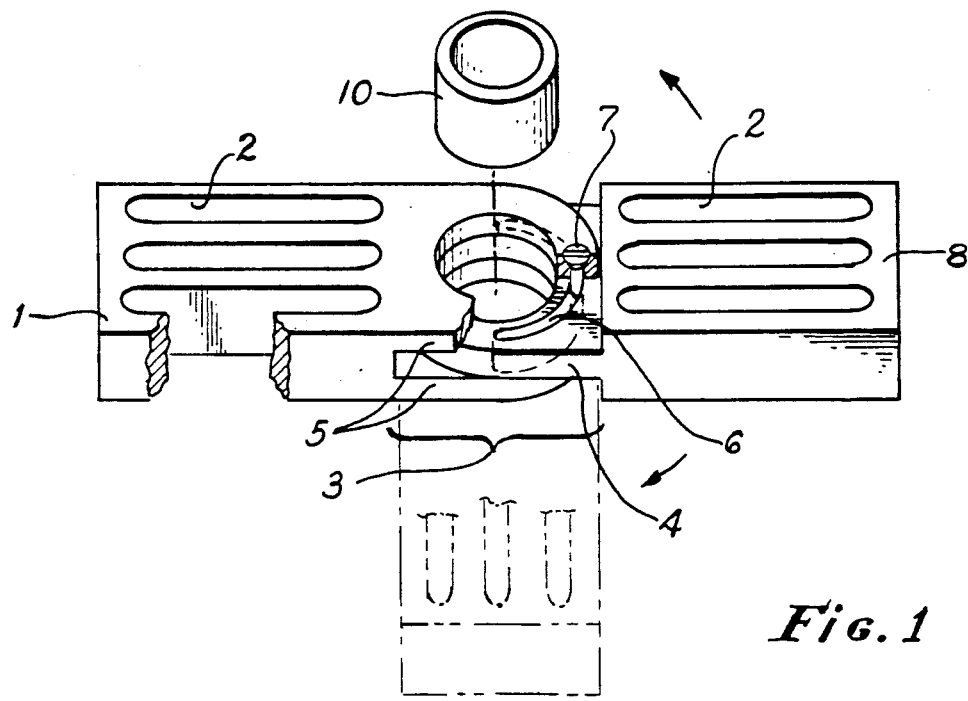
FIG. 1 is a perspective view of one preferred embodiment, cutaway to show some detail and partially exploded to show how it assembles.

The two figures show different embodiments of this simple device; elements not discussed twice may be assumed to be identical in the two.

The first clamp member (Item 1) is shown in both figures. It is of rectangular cross section and elongated, with holddown means 2 having the form of elongated through-slots in the preferred embodiment. The slots are of a width only slightly larger than the diameter of the anchoring fastener, which may be a bolt or Cleco clamp (wedgelock fastener). Item 3, a tongue and groove joint, is made up of flanges 5 forming the limits of the groove, and tongue 4 on second clamp member 8 in FIG. 1 or on offset member 9 in FIG. 2.

Figure 2:
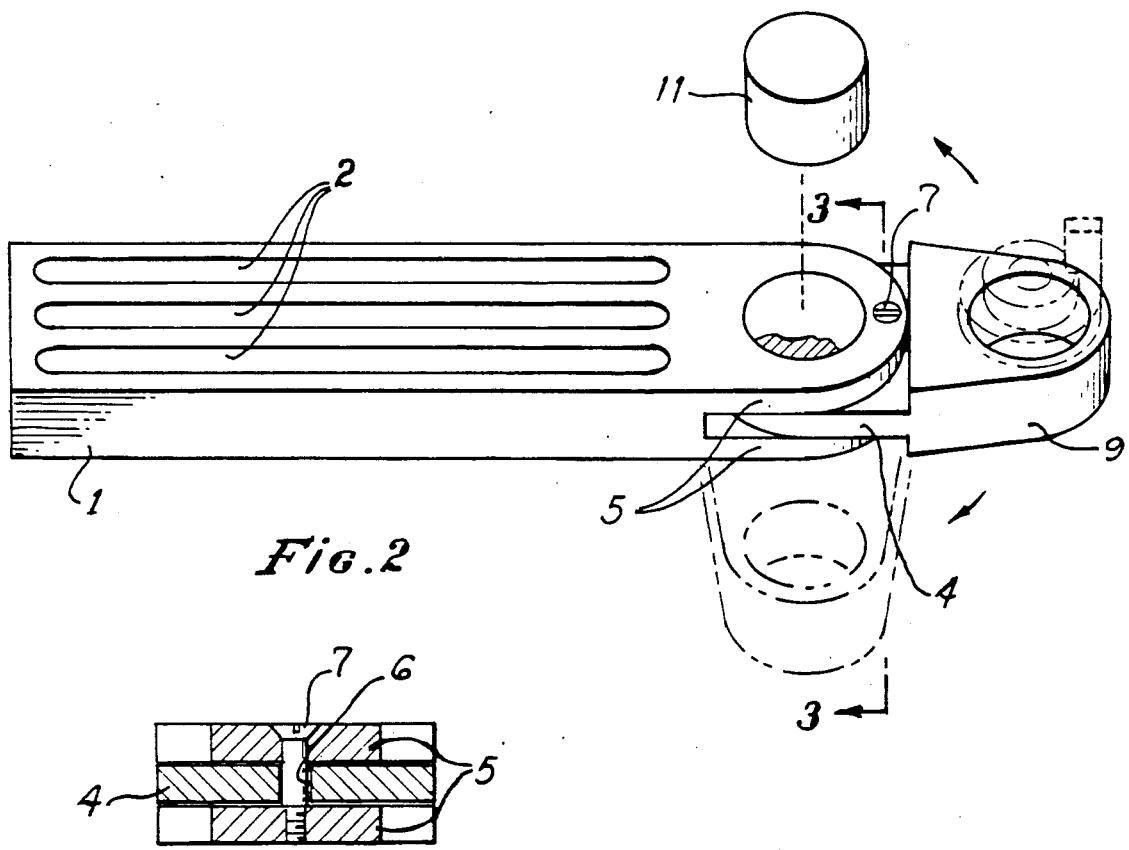
FIG. 2 is a perspective view of a second preferred embodiment, with a phantom view of a typical drill bushing holder.

Item 6 is a locking screw clearance arcuate slot, the arc being on the axis of a commercial drill bushing holder such as a lockliner bushing, shown in phantom lines in FIG. 2 or a simple commercial bushing holder Item 10 in FIG. 1. Various such bushing holders exist on the market. Since it is an integral part of the assembled tool, the drill bushing holder 10 in the preferred embodiments would be press fitted into either the first clamp member 1 or the second clamp member 8 and slidably fitted to the other member. The drill bushing holder establishes the position of (locates) the clamp members or the offset member. Glue or setscrews or any other means of causing the drill bushing holder 10 to link the two clamp members in FIG. 1 together while permitting angular motion are obviously well within existing art. Also a simple relief cut could replace locking screw clearance arcuate slot 6 should others consider the added ruggedness of the preferred embodiment unnecessary. Neither of these modifications is considered inventive; both are well within existing art.

Figure 3:
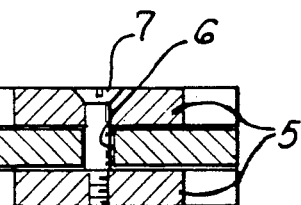
FIG. 3 is a cross section view of the locking screw detail.

Item 7 is a locking screw serving to squeeze flanges 5 (comprising the groove) against tongue 4 so as to maintain the desired angular relationship of the two clamp members to each other. The design is made clear by FIG. 3.

In FIG. 2 pin 11 functionally replaces the drill bushing holder 10 insofar as providing a pivot for, and holding together, the tongue and groove joint. The offset member item 9 swivels around pin 11 and is held at the desired angle with the clamp member 1 by means of locking screw 7, as described above for the preferred embodiment shown in FIG. 1. Offset member 9 has a hole at the opposite end from the tongue to receive a drill bushing holder. Obviously, the hole could be sized to accept a drill bushing directly as another embodiment.

The preferred material for all the parts described above is steel, though other metals or even plastic may be substituted.

The invention having been described in its preferred embodiment, it is clear that modifications are within the ability of those skilled in the art without exercise of the inventive faculty. Accordingly, the scope of the invention is defined in the scope of the following claims:

I claim:

1. A tool for reworking unsatisfactory fasteners through providing control of the position and rectilinearity of the rework cutting tool bushing, comprising:
    a first clamp member, elongated and of rectangular cross section having the groove of a tongue and groove joint at one end, and holddown means along the length of said first clamp member, stopping short both of the groove and of the far end of said first clamp member, said holddown means passing through the narrower dimension of the rectangle, and
    a second clamp member, elongated and of rectangular cross section having the tongue of the tongue and groove joint at one end, and
    holddown means along the length of said second clamp member stopping short both of the tongue and of the far end of said second clamp member, said holddown means passing through the narrower dimension of the rectangle, and
    a drill bushing holder passing perpendicularly through the tongue and groove joint, having an outer diameter which locates both said first and second clamp member while permitting them to form various angles, and
    a locking screw adjacent said drill bushing holder to clamp the tongue in the groove, and
    a locking screw clearance arcuate slot in the tongue of said second clamp member through which said locking screw freely passes.

2. A tool for reworking unsatisfactory fasteners through providing control of the position and rectilinearity of the rework cutting tool bushing, comprising:
    a clamp member, elongated and of rectangular cross section having the groove of a tongue and groove joint at one end, and
    holddown means along the length of said clamp member, stopping short both of the groove and of the far end of said first clamp member, said holddown means passing through the narrower dimension of the rectangle, and
    an offset member shorter than said clamp member, of rectangular cross section and having the tongue of a tongue and groove joint at one end and having a hold sized to receive a drill bushing holder at the other end, and
    a pin passing perpendicularly through the tongue and groove joint, having a diameter which locates both said clamp member and said offset member while permitting them to form various angles, and
    a locking screw adjacent said drill bushing holder to clamp the tongue in the groove, and
    a locking screw clearance arcuate slot in the tongue of said second clamp member through which said locking screw freely passes.

* * * * *